July 19, 1927.

S. HOSKO 1,636,096

FISH NET

Filed Feb. 8, 1926

2 Sheets-Sheet 1

Inventor
Stephen Hosko
By
Attorney

July 19, 1927.

S. HOSKO

FISH NET

Filed Feb. 8, 1926

1,636,096

2 Sheets-Sheet 2

Inventor
Stephen Hosko
By Faust F. Crampton
Attorney

Patented July 19, 1927.

1,636,096

UNITED STATES PATENT OFFICE.

STEPHEN HOSKO, OF BONO, OHIO.

FISH NET.

Application filed February 8, 1926. Serial No. 86,758.

My invention has for its object to provide an efficient fish net that will guide the fish to the crib and which is so constructed as to prevent the escape of the fish. It also provides a means whereby the fish may be readily removed and the crib may be easily handled.

The invention may be contained in fish nets that partake of different forms and to illustrate a practical application of the invention, I have selected a fish net containing the invention and shall describe it hereinafter. The fish net selected is shown in the accompanying drawings.

Figure 1:
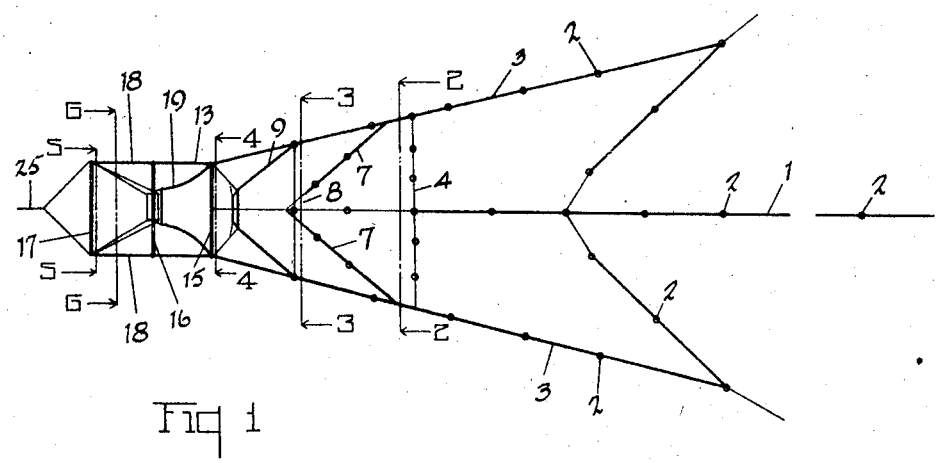
Figure 2:
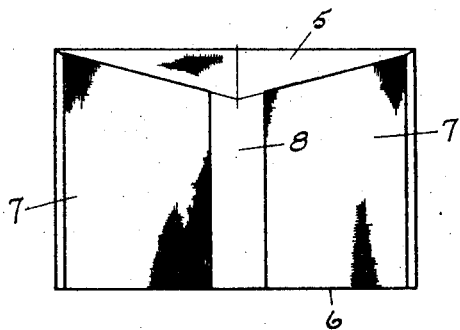
Figure 3:
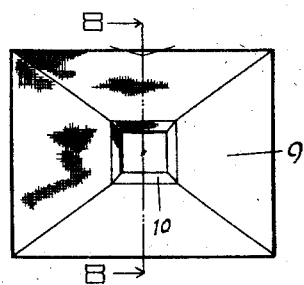
Figure 4:
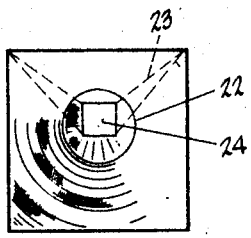
Figure 5:
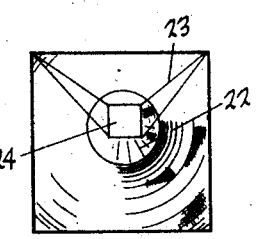
Figure 11:
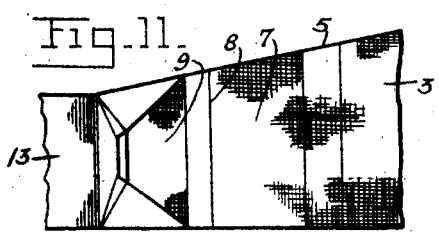
Figure 6:
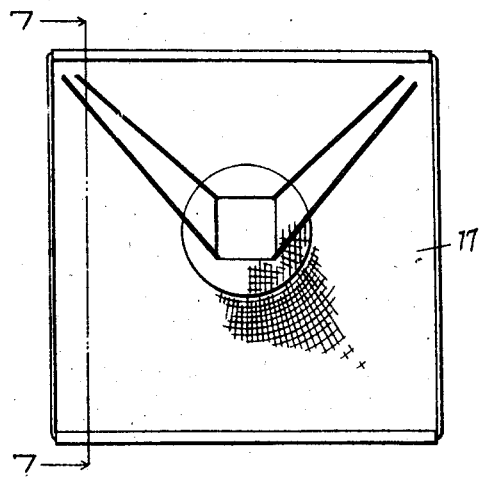
Figure 7:
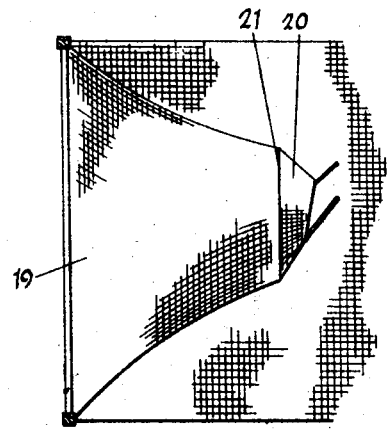
Figure 9:
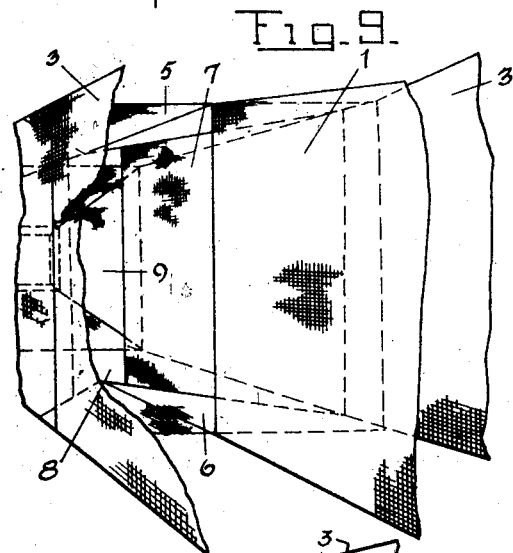
Figure 8:
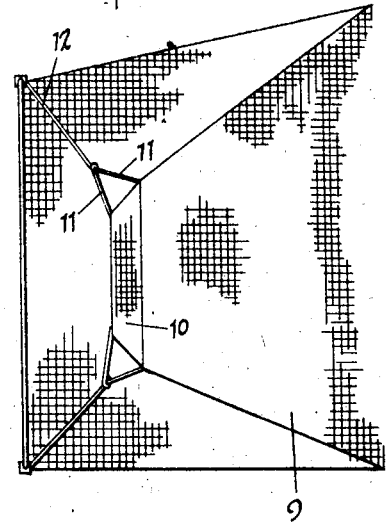
Figure 10:
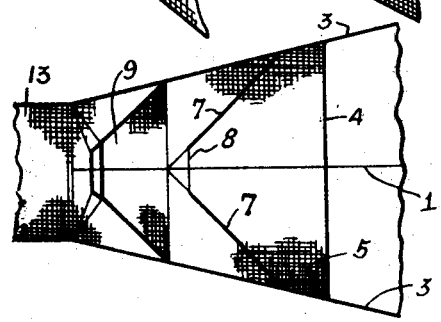

Figure 1 of the drawings is a top view of the fish net. Fig. 2 is a view of a section taken on the plane of the line 2—2 indicated in Fig. 1. Fig. 3 is a view of a section taken on the plane of the line 3—3 indicated in Fig. 1. Fig. 4 is a view of a section taken on the plane of the line 4—4 indicated in Fig. 1 and Fig 5 is a view of a section taken on the plane of the line 5—5 indicated in Fig. 1. Fig. 6 is a view of a section taken on the plane of the line 6—6 indicated in Fig. 1. Fig. 7 is a view of a section taken on the plane of the line 7—7 indicated in Fig. 6 and Fig. 8 is a view of a section taken on the plane of the line 8—8 indicated in Fig. 3. Fig. 9 is a perspective view of parts of the net, portions of which have been broken away in order that the arrangement of the parts may be more clearly shown. Fig. 10 is a top view of a part of the net. Fig. 11 is a side elevation of the part of the net shown in Fig. 10.

In the net shown in the drawings, the net is provided with a long lead net of the form commonly used in connection with commercial fish nets. It may be connected to suitable stakes and provided with floats for carrying the upper edge and suitable sinkers for causing the lower edge to lie along the bottom of the lake or other body of water in which the net may be located In the form of construction shown in the drawings the net is provided with the floats 2 that are located not only along the lead 1 but also other parts of the net as shown in Fig 1 of the drawings. Along the lower edge of the parts of the net and opposite the floats, sinkers are located and their location may be also indicated by the numeral 2 as shown in Fig. 1. Ordinarily a chain may be strung along the edges of the net opposite to the edges to which the floats 2 are connected for the purpose of sinking edges of the portions that form the fish net selected as an example of structures containing my invention and shown in the drawings. The mesh portions are shown in heavy lines while the ropes are shown in lighter lines as will appear upon examination of Fig. 1.

Two side nets 3 converge towards each other and are located on opposite sides of the end portion of the lead net 1 and extend beyond the end of the lead net 1. Cross lines 4 extend across the end of the lead net 1 to the side nets 3. A roof net 5 and a floor net 6 extend from the ropes 4 and between the upper and lower edges of the side nets 3. The roof net 5 slopes downward toward the bottom of the lake or other body of water while the floor net 6 is located horizontally, that is, along the bottom of the bed. The slope of the side nets 3 begins at the point where the ends of the rope 4 connect with the edges of the sides 3, that is, where the roof net and floor net begin.

Within the space defined between the side, floor and roof nets are located two winged nets 7 that converge more sharply than the side nets 3 and their inner edges terminate in close proximity to each other to form a substantially narrow slit or narrow opening 8 having its major length located vertically. A relatively large funnel trap 9 having its outer end edges, that is, its larger end edges connected to the side nets 3 and the roof net 5 and the floor net 6 so as to position its larger end around the narrow opening 8. The funnel 9 is provided with a mouth portion 10 that is contracted at a sharper angle than the body portion of the funnel. This is produced by connecting guy ropes 11 to points in the line of connection between the mouth portion 10 and the body portion of the funnel 9 and to points on the edge of the mouth and connecting the guy ropes 11 to stay ropes 12 so as to draw the said points outward. This produces a change in the angle of the wall of the funnel which will cause the fish to enter the trap. The roof, floor and side nets terminate in a crib 13 to which the stay ropes 12 are connected and whereby the mouth portion 10 may be made to conform to the particular shape illustrated in Fig. 8. The crib 13 is formed of three frames 15, 16 and 17 that are spaced apart by means of rods located in the corners as at 18. The crib is covered by means of a net which extends over five sides. A funnel 19 extends into the crib from the frame 15 which forms the sixth side of the crib. The funnel 19 has a mouth portion 20 which is more sharply contracted than the body portion of the funnel. It is formed cylindrical along the line of connection between the mouth portion 20 and the body portion 19 as at 21 by means of a hoop 22. Stay ropes 23 may be connected at four points of the mouth 24 and to the upper side or to the corners of the frame 17 which will make the mouth square in form and hold it open and at the same time draw the mouth portion upward and so that the axis of the mouth portion 20 will be inclined upwardly. The fish that will pass through the funnel trap 19 will not be inclined to pass out through the mouth not only because of its contracted form but also because of the fact that as a rule fish will not go diagonally down to escape from the crib. The end 24 may be closed by flaps that are secured together in any suitable way and which may be readily opened to remove the fish. The crib may be secured in position by means of the rope 25 which may be connected to a suitable anchor.

I claim:

In a fish net, a lead net, a crib, a pair of converging side nets located on opposite sides of the end of the lead net and terminating at the crib, roof and floor nets extending between the end portions of the upper and lower edges of the side nets and extending from the end of the lead net and terminating with the side nets at the crib, the portion of the lead net located between the side nets being equal to substantially one half or the length of the side nets, the crib having a funnel trap for the admission of the fish from the space between the side, floor and roof nets, the side of the mouth portion of the funnel contracted at a sharper angle to the horizontal than the side of the body portion of the funnel and stay ropes connected to the upper side of the crib for turning the axis of the mouth portion upward.

In testimony whereof I have hereunto signed my name to this specification.

STEPHEN HOSKO.